R. H. ANDERSON.
ROAD DRAG.
APPLICATION FILED MAR. 9, 1916.
1,185,863.
Patented June 6, 1916.
2 SHEETS—SHEET 2.
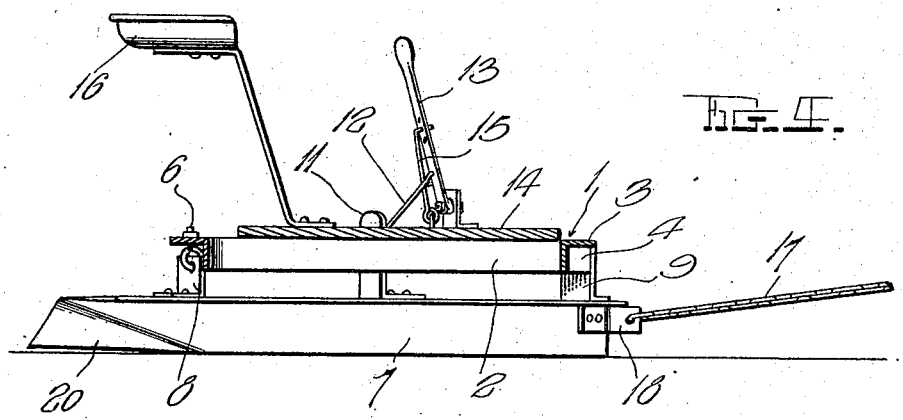
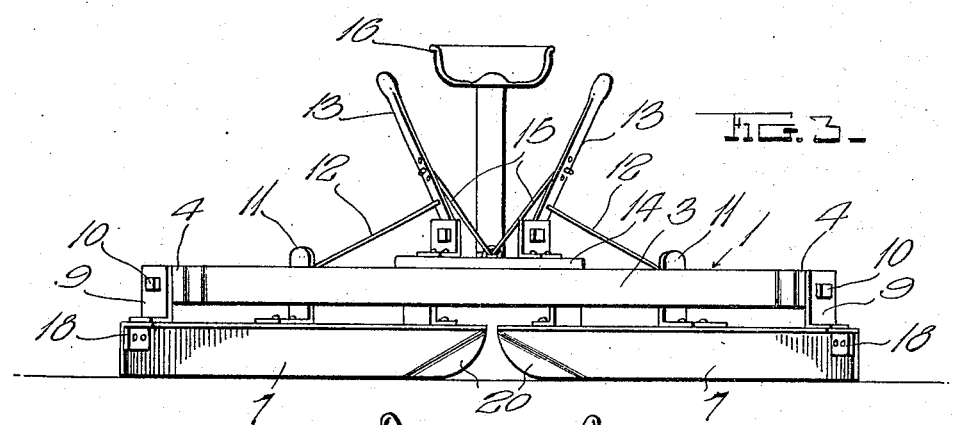
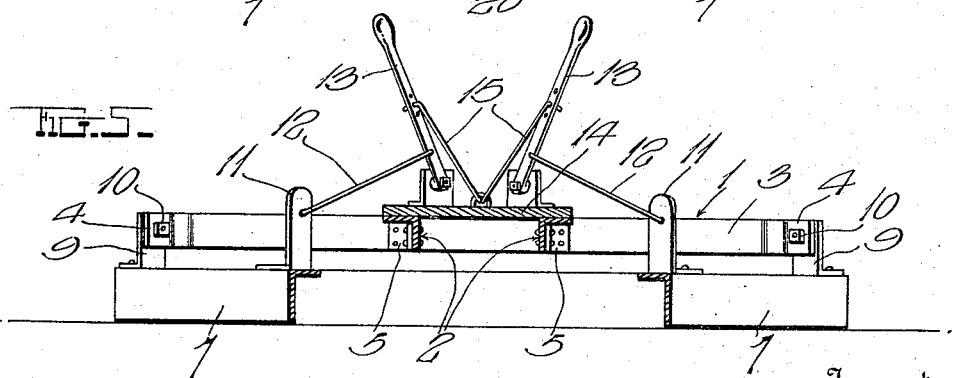
Witnesses
H. Woodard
Inventor
Roy H. Anderson
by H. R. Willson & Co.
Attorneys

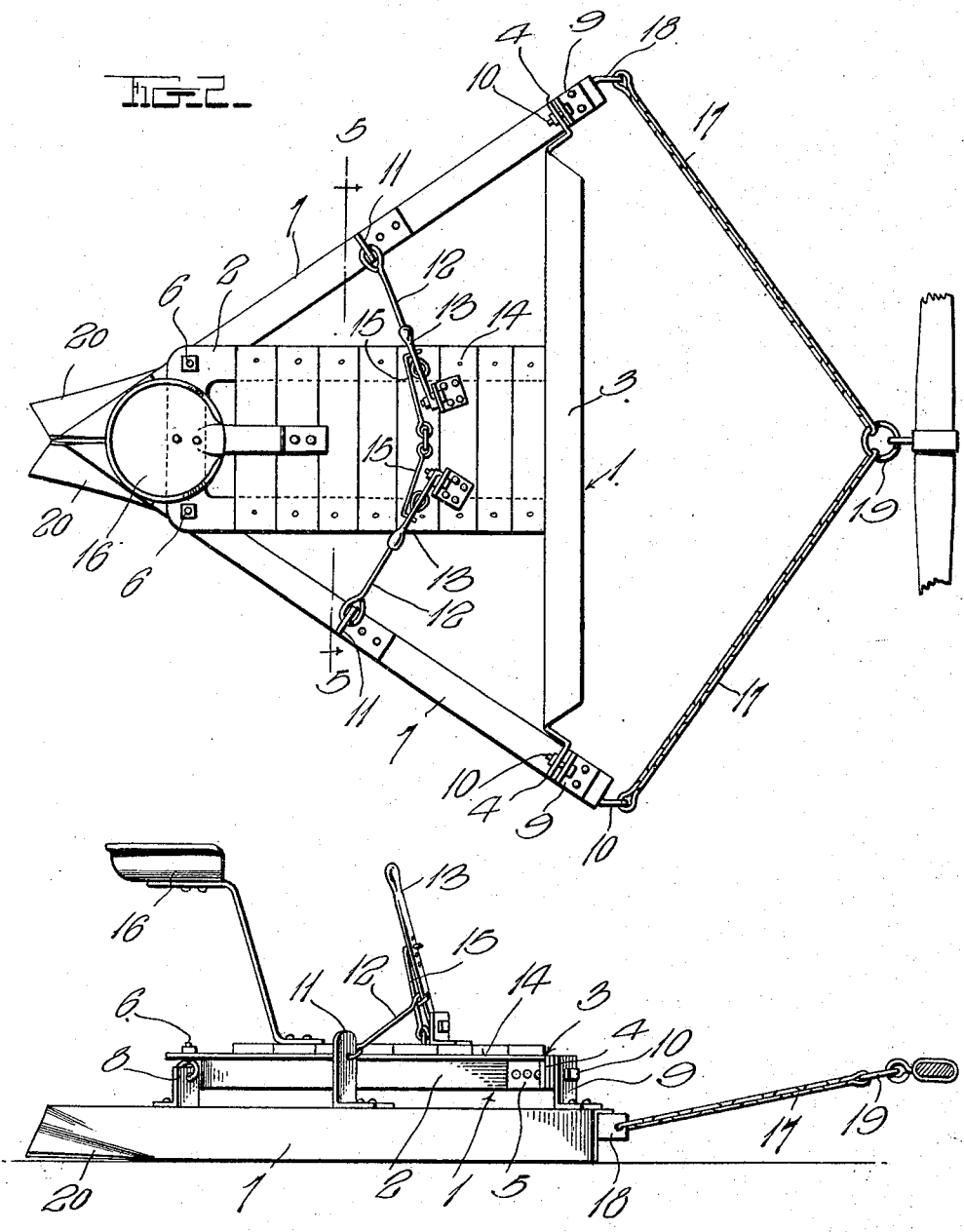

UNITED STATES PATENT OFFICE.

ROY HERBERT ANDERSON, OF BROOKINGS, SOUTH DAKOTA.

ROAD-DRAG.

1,185,863.     Specification of Letters Patent.     Patented June 6, 1916.

Application filed March 9, 1916. Serial No. 83,128.

*To all whom it may concern:*

Be it known that I, ROY H. ANDERSON, a citizen of the United States, residing at Brookings, in the county of Brookings and State of South Dakota, have invented certain new and useful Improvements in Road-Drags; and I do declare the following to be a full, clear, and exact description of the invention, such as will enable others skilled in the art to which it appertains to make and use the same.

My invention which relates to improvements in road drags, has for its object to provide a machine of this class which may be easily and inexpensively manufactured, yet one which when applied to use will be highly efficient and durable.

With this general object in view, the invention consists of certain novel features of construction and unique combinations of parts to be hereinafter fully described and claimed, the descriptive matter being supplemented by the accompanying drawings which constitute a part of this application and in which:

Figure 1 is a side elevation of a road drag constructed in accordance with my invention; Fig. 2 is a top plan view thereof; Fig. 3 is a front elevation; Fig. 4 is a longitudinal section taken on the plane indicated by the line 4—4 of Fig. 2; and Fig. 5 is a vertical transverse section, as viewed on the plane indicated by line 5—5 of Fig. 2.

In specifically describing the construction shown in the drawings above briefly described, similar characters will be placed on corresponding parts throughout the several views, and reference will be herein made to the numerous elements by their respective indices. To this end, the numeral 1 designates a T-frame positioned in a horizontal plane, the shank 2 of said frame being disposed longitudinally of the line of travel of the drag, while the shank 3 thereof is of course positioned transversely to such line, being located at the front end of the shank 2.

The head 3 is preferably formed of an angle-iron bar having a vertical and a horizontal flange, the latter extending forwardly from the upper edge of the former. The horizontal flange is removed at its ends as depicted most clearly in Fig. 2, and the ends of the upright flange are here bent to dispose them obliquely in respect to the body of the head 3, such ends constituting ears 4 for a purpose yet to be described.

The shank 2 may be of any preferred construction, but it is preferably formed of a single angle-iron bar bent into the form of a U with its ends secured by brackets or the like 5 to the intermediate portion of the head 3, the horizontal flange of said bar at the rear end of the shank being pierced to receive eye-bolts 6 whose eyes are disposed beneath said flanges as depicted in Fig. 1.

The eye-bolts 6 coöperate with the ears 4 in connecting a pair of rearwardly converging grading blades 7 to the frame, said blades being preferably formed of angle-iron and having front and rear L-shaped brackets 8 and 9 respectively. The brackets 8 are perforated and engage the eyes of the bolts 6 while the brackets 9 are pivoted by bolts or the like 10 to the ears 4, the bolts being disposed longitudinally of the blades as shown clearly in Fig. 2. By mounting the blades in this manner, they may be rocked around their pivots to vary their angular relation with the roadway being graded, and for so rocking said blades and holding them after being adjusted, rigid crank arms 11 rise from said blades and are pivoted to the outer ends of links 12 whose inner ends are in turn pivotally connected with levers 13 mounted on a platform 14 carried by the shank 2 of the frame 1, hooks or the like 15 being provided for holding said levers in adjusted position.

The two levers 13 are positioned in advance of an appropriate driver's seat 16 also mounted on the platform 14 as shown. Thus, the angular relation of the blades 7 may be adjusted at will from the driver's seat.

Any preferred type of draft device may be used in connection with the improved drag, but chains 17 preferably lead from ears 18 secured to the front ends of the blades 7, to a ring 19, the latter being adapted for the attachment of a swingle tree, double-tree or the like.

In operation, the machine is drawn over the roadway after properly adjusting the blades 7, the latter now smoothing the road and moving the large clods of earth and stones to the center of the drag from which they will be discharged through the space between the ends of the blades 7, the lower rear corners of said blades being preferably deflected outwardly at 20 to facilitate this operation. A ridge of clods and rock is thus formed at the center of the roadway, which clods and rock may be crushed in any preferred manner.

From the foregoing, taken in connection with the accompanying drawings, the construction, manner of operation and desirable features of the improved machine will be readily understood without requiring a more extended explanation. In conclusion, however, I will state that although certain specific details have been shown and described for accomplishing probably the best results, numerous changes may be made within the scope of the invention as claimed without sacrificing the main advantages thereof.

I claim:—

1. A road drag comprising a T-frame disposed in a horizontal plane with the shank of the T positioned longitudinally of the line of travel of the drag, the head of the T being formed of a single metal bar positioned at the front end of the shank and having its ends bent obliquely into rearwardly diverging relation, a pair of rearwardly converging grading blades underlying the frame and pivotally connected at their rear ends with the rear end of the shank thereof, brackets rising from the front ends of said blades, pivot bolts passing through said brackets and through the aforesaid ends of the head of the frame, crank arms rising from the blades, links extending inwardly from said arms, and means for holding said links in a number of positions to vary the angular relation of the blades in respect to the roadway.

2. A road drag comprising a T-frame whose shank is disposed longitudinally of the line of travel of the drag, said shank being formed of a single angle metal bar bent in the form of a U with its ends disposed at the front end of the machine, the head of the T-frame being in the form of a transverse angle metal bar secured to the ends of the aforesaid bar and in turn having its ends bent rearwardly into diverging relation, a pair of rearwardly converging grading blades underlying the T-frame, pivotal connections between the rear ends of said blades and the rear end of the shank of said frame, brackets rising from the front ends of said blades, pivot bolts passing through said brackets and through the rearwardly bent ends of the aforesaid head of the frame, rigid crank arms rising from the blades, links extending inwardly from said crank arms, and means for holding said links in a number of positions to vary the angular relation of the blades with the roadway.

In testimony whereof I have hereunto set my hand in presence of two subscribing witnesses.

ROY HERBERT ANDERSON.

Witnesses:
R. E. CONE,
M. L. TOBIN.

Copies of this patent may be obtained for five cents each, by addressing the "Commissioner of Patents, Washington, D. C."